US012715955B2

(12) United States Patent
Wada et al.

(10) Patent No.: US 12,715,955 B2
(45) Date of Patent: Aug. 25, 2026

(54) POLYOL COMPOSITION FOR PRODUCING POLYURETHAN RESIN, POLYURETHANE RESIN-FORMING COMPOSITION, AND POLYURETHANE RESIN

(71) Applicant: SANYO CHEMICAL INDUSTRIES, LTD., Kyoto (JP)

(72) Inventors: Masanobu Wada, Kyoto (JP); Chie Sato, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 18/851,280

(22) PCT Filed: Mar. 16, 2023

(86) PCT No.: PCT/JP2023/010302

§ 371 (c)(1),
(2) Date: Sep. 26, 2024

(87) PCT Pub. No.: WO2023/189653

PCT Pub. Date: Oct. 5, 2023

(65) Prior Publication Data

US 2025/0215143 A1 Jul. 3, 2025

(30) Foreign Application Priority Data

Mar. 29, 2022 (JP) ................................ 2022-053360

(51) Int. Cl.

| | |
|---|---|
| ***C08G 18/50*** | (2006.01) |
| ***C08G 18/38*** | (2006.01) |
| ***C08G 18/46*** | (2006.01) |
| ***C08G 18/80*** | (2006.01) |
| ***C09D 175/12*** | (2006.01) |
| ***C09J 175/12*** | (2006.01) |

(52) U.S. Cl.

CPC ..... *C08G 18/5024* (2013.01); *C08G 18/3838* (2013.01); *C08G 18/4615* (2013.01); *C08G 18/8051* (2013.01); *C09D 175/12* (2013.01); *C09J 175/12* (2013.01); *C08G 2150/00* (2013.01); *C08G 2190/00* (2013.01)

(58) Field of Classification Search

CPC ........... C08G 18/5024; C08G 18/3838; C08G 2150/00; C08G 2190/00; C08G 18/4615; C08G 18/8051; C09D 175/12; C09J 175/12

See application file for complete search history.

(56) References Cited

U.S. PATENT DOCUMENTS 6,176,891 B1 1/2001 Komoriya et al.
6,322,606 B1 11/2001 Komoriya et al.

FOREIGN PATENT DOCUMENTS

| | | |
|---|---|---|
| JP | 7-213871 | 8/1995 |
| JP | 10-265288 | 10/1998 |
| JP | 4443852 B2 * | 3/2010 |
| JP | 2014-9311 | 1/2014 |
| JP | 2015-142908 | 8/2015 |
| JP | 2017-6874 | 1/2017 |
| JP | 2018-203577 | 12/2018 |
| JP | 2020-147713 | 9/2020 |
| JP | 2021-17563 | 2/2021 |
| WO | 2017/006650 | 1/2017 |

OTHER PUBLICATIONS

International Search Report issued May 30, 2023 in International (PCT) Application No. PCT/JP2023/010302.

International Preliminary Report on Patentability issued Sep. 24, 2024 in International Application No. PCT/JP2023/010302.

* cited by examiner

*Primary Examiner* — Rabon A Sergent

(74) *Attorney, Agent, or Firm* — Wenderoth, Lind & Ponack, L.L.P.

(57) ABSTRACT

The present invention aims to provide a polyol composition for producing a polyurethane resin, the polyol composition being capable of providing a polyurethane resin-forming composition having low viscosity and an appropriately long pot life and thus having good castability and providing a cured polyurethane resin having excellent moisture and heat resistance and substrate adhesion. The present invention relates to a polyol composition for producing a polyurethane resin, the polyol composition containing an ester (A) of a hydroxycarboxylic acid (h) and at least one of an amine polyol (a1) represented by the following formula (1) or a polyamine polyol (a2) represented by the following formula (2).

[Chem. 1]

(1)

[Chem. 2]

(2)

9 Claims, No Drawings

POLYOL COMPOSITION FOR PRODUCING POLYURETHAN RESIN, POLYURETHANE RESIN-FORMING COMPOSITION, AND POLYURETHANE RESIN

TECHNICAL FIELD

The present invention relates to a polyol composition for producing a polyurethane resin, a polyurethane resin-forming composition, and a polyurethane resin.

BACKGROUND ART

Curable polyurethane resin compositions have excellent properties such as toughness and abrasion resistance owing to intermolecular hydrogen bonds formed by urethane bonds. They are therefore used in a wide range of applications such as adhesive or pressure-sensitive adhesive application and coating, casting, or sealing application. Known curable polyurethane resin compositions include two-component curable polyurethane resin compositions each consisting of a polyol component and a polyisocyanate component.

Two-component curable polyurethane resin compositions for casting and two-component curable polyurethane resin compositions for coating are required to have low viscosity and a long pot life from the viewpoints of castability and coatability, respectively.

Known urethane resin compositions for casting having a long pot life include those that contain N,N,N',N'-tetrakis (2-hydroxypropyl)-ethylenediamine as part of the polyol component (see, for example, Patent Literature 1). However, when the amount of N,N,N',N'-tetrakis(2-hydroxypropyl)-ethylenediamine is large, the viscosity of the polyol component increases, and the viscosity at the early stage of mixing with a polyisocyanate component also increases, which can result in defective filling.

As an example of a two-component curable polyurethane resin composition having a reduced viscosity at the early stage of mixing, Patent Literature 2 discloses a polyurethane resin-forming composition containing a polyol component that contains a castor oil-based polyol, a polyoxyethylene polyoxypropylene aliphatic polyamine, and a polyoxypropylene aliphatic polyamine in a specific content ratio. Patent Literature 3 discloses a polyurethane resin-forming composition containing a polyol component that contains a castor oil-based polyol and a polyoxyethylene polyoxypropylene aliphatic polyamine and/or a polyoxypropylene aliphatic polyamine.

CITATION LIST

Patent Literature

Patent Literature 1: JP H07-213871 A
Patent Literature 2: WO 2017/6650
Patent Literature 3: JP 2020-147713 A

SUMMARY OF INVENTION

Technical Problem

However, as for the polyol components disclosed in Patent Literatures 2 and 3, if the number of moles of oxyalkylene groups added per mole of the aliphatic polyamine is increased in order to reduce the viscosity, the amount of oxyalkylene groups in the entire polyol component increases, which can cause a problem of insufficient moisture and heat resistance or insufficient adhesion of the cured polyurethane resin.

The present invention aims to provide a polyol composition for producing a polyurethane resin, the polyol composition being capable of providing a polyurethane resin-forming composition having low viscosity and an appropriately long pot life and thus having good castability and providing a cured polyurethane resin having excellent moisture and heat resistance and substrate adhesion.

Solution to Problem

The present inventors conducted extensive studies to solve the above problems and arrived at the present invention. Specifically, the present invention relates to a polyol composition for producing a polyurethane resin, the polyol composition containing an ester (A) of a hydroxycarboxylic acid (h) and at least one of an amine polyol (a1) represented by the following formula (1) or a polyamine polyol (a2) represented by the following formula (2); a polyurethane resin-forming composition containing the polyol composition for producing a polyurethane resin and a polyisocyanate (B); and a polyurethane resin which is a cured product of the polyurethane resin-forming composition.

The formula (1) is as follows:

[Chem. 1]

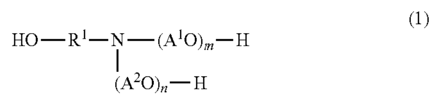

(1)

wherein $R^1$ represents a C2-C12 alkylene group; $A^1O$ and $A^2O$ each independently represent a C2-C3 oxyalkylene group; and m and n each independently represent a number average mole of oxyalkylene groups added, are each a number of 0 to 2, and satisfy the equation: m+n=1.5 to 4.0.

The formula (2) is as follows:

[Chem. 2]

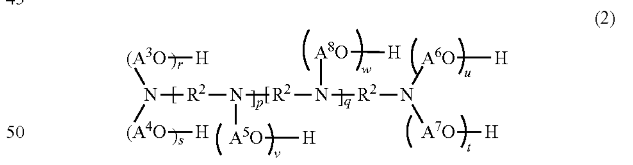

(2)

wherein each $R^2$ independently represents a C2-C12 alkylene group; p and q each independently represent an integer of 0 or 1; $A^3O$, $A^4O$, $A^5O$, $A^6O$, $A^7O$, and $A^8O$ each independently represent a C2-C3 oxyalkylene group; and r, s, t, u, v, and w each independently represent a number average mole of oxyalkylene groups added, are each a number of 0 to 2, and satisfy the equation: r+s+t+u+v+w=3.0 to 7.0, where when p is 0, v is 0, and when q is 0, w is 0.

Advantageous Effects of Invention

The polyol composition for producing a polyurethane resin of the present invention has the effects of providing a polyurethane resin-forming composition having low viscosity and an appropriately long pot life and thus having good castability and providing a cured polyurethane resin having excellent moisture and heat resistance and substrate adhesion.

DESCRIPTION OF EMBODIMENTS

The polyol composition for producing a polyurethane resin of the present invention contains an ester (A) of a hydroxycarboxylic acid (h) and at least one of an amine polyol (a1) represented by the following formula (1) or a polyamine polyol (a2) represented by the following formula (2), the formula (1) being as follows:

[Chem. 3]

(1)

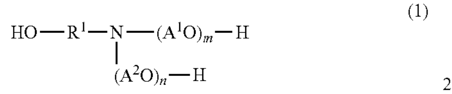

wherein $R^1$ represents a C2-C12 alkylene group; $A^1O$ and $A^2O$ each independently represent a C2-C3 oxyalkylene group; and m and n each independently represent a number average mole of oxyalkylene groups added, are each a number of 0 to 2, and satisfy the equation: m+n=1.5 to 4.0, the formula (2) being as follows:

[Chem. 4]

(2)

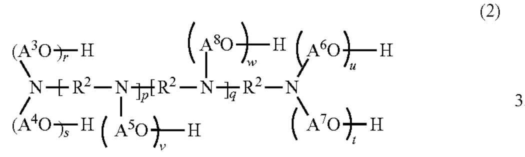

wherein each $R^2$ independently represents a C2-C12 alkylene group; p and q each independently represent an integer of 0 or 1; $A^3O$, $A^4O$, $A^5O$, $A^6O$, $A^7O$, and $A^8O$ each independently represent a C2-C3 oxyalkylene group; and r, s, t, u, v, and w each independently represent a number average mole of oxyalkylene groups added, are each a number of 0 to 2, and satisfy the equation: r+s+t+u+v+w=3.0 to 7.0, where when p is 0, v is 0, and when q is 0, w is 0.

<Ester (A)>

In the present invention, the ester (A) is an ester of a hydroxycarboxylic acid (h) and at least one selected from the group consisting of an amine polyol (a1) represented by the formula (1) and a polyamine polyol (a2) represented by the formula (2).

Hereinafter, the terms "amine polyol" and "polyamine polyol" are collectively referred to as "(poly)amine polyol".

In the formula (1), $R^1$ represents a C2-C12 alkylene group (alkylene group having 2 to 12 carbon atoms), and may be a linear alkylene group or a branched alkylene group. From the viewpoint of adhesion of the polyurethane resin, $R^1$ is preferably a C2-C6 alkylene group, more preferably a C2-C4 alkylene group.

In the formula (1), $A^1O$ and $A^2O$ each independently represent a C2-C3 oxyalkylene group (oxyalkylene group having 2 to 3 carbon atoms). Examples of the C2-C3 oxyalkylene group include an oxyethylene group (hereinafter sometimes abbreviated as an EO group) and an oxypropylene group (hereinafter sometimes abbreviated as a PO group).

When multiple $A^1$Os are present in a molecule, they may be the same as or different from each other. When multiple $A^2$Os are present in the molecule, they may be the same as or different from each other.

In the formula (1), m and n each independently represent the number average mole of oxyalkylene groups added, are each a number of 0 to 2, and satisfy the equation: m+n=1.5 to 4.0. Preferably, the equation: m+n=1.5 to 3.0 is satisfied, more preferably, the equation: m+n=1.5 to 2.5 is satisfied, and particularly preferably, the equation: m+n=1.9 to 2.1 is satisfied.

If (m+n) is less than 1.5, the pot life of the polyurethane resin-forming composition may reduce and the castability thereof is insufficient, while if (m+n) is more than 4.0, the curability of the polyurethane resin-forming composition is insufficient and the moisture and heat resistance of the urethane resin deteriorates.

Specific examples of the amine polyol (a1) represented by the formula (1) include adducts of C2-C12 alkanolamines (e.g., monoethanolamine, diethanolamine, triethanolamine) with C2-C3 alkylene oxide, such as N-hydroxyethyl-N,N-di(2-hydroxypropyl)amine.

In the formula (2), each $R^2$ independently represents a C2-C12 alkylene group (alkylene group having 2 to 12 carbon atoms). Examples of the alkylene group include a linear alkylene group and a branched alkylene group. From the viewpoint of adhesion of the polyurethane resin, $R^2$ is preferably a C2-C6 alkylene group, more preferably a C2-C4 alkylene group. When multiple $R^2$s are present in the molecule, they may all be the same as each other.

In the formula (2), p and q each independently represent an integer of 0 or 1. From the viewpoint of castability, at least one of p or q is preferably 0.

Here, p and q are symbols indicating that the polyamine polyol (a2) represented by the formula (2) may have two different structural units in the central part of the molecule, and these are not distinguished.

In the formula (2), $A^3O$, $A^4O$, $A^5O$, $A^6O$, $A^7O$, and $A^8O$ each independently represent a C2-C3 oxyalkylene group (oxyalkylene group having 2 to 3 carbon atoms). Examples of the C2-C3 oxyalkylene group include an oxyethylene group and an oxypropylene group, with an oxypropylene group being preferred.

When multiple $A^3$Os are present in the molecule, they may be the same as or different from each other. When multiple $A^4$Os are present in the molecule, they may be the same as or different from each other. When multiple $A^5$Os are present in the molecule, they may be the same as or different from each other. When multiple $A^6$Os are present in the molecule, they may be the same as or different from each other. When multiple $A^7$Os are present in the molecule, they may be the same as or different from each other. When multiple $A^8$Os are present in the molecule, they may be the same as or different from each other.

In the formula (2), r, s, t, u, v, and w each independently represent the number average mole of oxyalkylene groups added, are each a number of 0 to 2, and satisfy the equation: r+s+t+u+v+w=3.0 to 7.0. Preferably, the equation: r+s+t+u+v+w=3.0 to 6.7 is satisfied, more preferably, the equation: r+s+t+u+v+w=3.0 to 6.4 is satisfied, and particularly preferably, the equation: r+s+t+u+v+w=3.6 to 6.4 is satisfied.

If (r+s+t+u+v+w) is less than 3.0, the pot life of the polyurethane resin-forming composition reduces and the castability is insufficient, while if (r+s+t+u+v+w) is more than 7.0, the curability of the polyurethane resin-forming composition is insufficient and the moisture and heat resistance of the urethane resin deteriorates.

Here, when p is 0, v is 0, and when q is 0, w is 0.

Specific examples of the polyamine polyol (a2) represented by the formula (2) include adducts of C2-C12 alkylene diamines with C2-C3 alkylene oxide [e.g., N,N,N',N'-tetrakis(2-hydroxypropyl)ethylenediamine, N,N,N',N'-tetrakis(2-hydroxyethyl)ethylenediamine], and adducts of dialkylene (the number of carbon atoms: 2 to 12) polyamines or trialkylene (the number of carbon atoms: 2 to 12) polyamines with C2-C3 alkylene oxide [e.g., N,N,N',N",N"-pentakis(2-hydroxypropyl)diethylenetriamine, N,N,N',N",N"-pentakis(2-hydroxyethyl)diethylenetriamine, N,N, N',N",N'",N'"-hexakis (2-hydroxypropyl)triethylenetetramine]. Of these, N,N,N',N'-tetrakis(2-hydroxypropyl)ethylenediamine and N,N,N',N",N"-pentakis(2-hydroxypropyl) diethylenetriamine are preferred, with N,N,N',N'-tetrakis(2-hydroxypropyl)ethylenediamine being more preferred, from the viewpoints of the pot life and castability of the polyurethane resin-forming composition and the moisture and heat resistance and substrate adhesion of the cured polyurethane resin.

Examples of the hydroxycarboxylic acid (h) include monocarboxylic acids having one or more hydroxy groups in the molecule. Specific examples thereof include: aliphatic hydroxymonocarboxylic acids including those having 2 to 30 carbon atoms (the number of carbon atoms includes the carbonyl carbon, and the same applies to the following carboxylic acids), such as those having one hydroxy group in the molecule (e.g., glycolic acid, lactic acid, hydroxybutyric acid, hydroxycaproic acid, hydroxyhexanoic acid, hydroxypentadecanoic acid, hydroxyhexadecanoic acid, ricinoleic acid, castor oil fatty acid, hydroxystearic acid, hydroxyeicosanoic acid) and those having two or more hydroxy groups in the molecule (e.g., glyceric acid, dimethylolpropionic acid, dimethylolbutanoic acid, dimethylolpentanoic acid, dimethylolhexanoic acid, dihydroxystearic acid, dihydroxyeicosatetraenoic acid); and aromatic ring-containing hydroxymonocarboxylic acids including those having 7 to 30 carbon atoms (e.g., salicylic acid, mandelic acid, gallic acid, 2-hydroxy-4-phenylbutyric acid).

Of these hydroxycarboxylic acids (h), C7-C21 (the number of carbon atoms includes the carbonyl carbon) monocarboxylic acids (h1) (monocarboxylic acids having 7 to 21 carbon atoms) having one hydroxy group in the molecule are preferred, with aliphatic hydroxymonocarboxylic acids having one hydroxy group in the molecule being more preferred and ricinoleic acid and castor oil fatty acid being particularly preferred, from the viewpoints of adhesion and the like.

The ester (A) in the present invention is an ester of the hydroxycarboxylic acid (h) and the amine polyol (a1) and/or the polyamine polyol (a2). The ester (A) may be produced by any method and can be produced by a known method such as a method including heating the polyamine polyol (a1) and/or the polyamine polyol (a2) and the hydroxycarboxylic acid (h) in the presence of a condensation catalyst [e.g., titanium dihydroxy bis(triethanolaminate)] and performing dehydration condensation while distilling off the generated water.

The ester (A) is not limited to a direct reaction product of the amine polyol (a1) and/or the polyamine polyol (a2) and the hydroxycarboxylic acid (h), and may be a transesterification reaction product of the amine polyol (a1) and/or the polyamine polyol (a2) and a hydroxycarboxylic acid ester (e.g., ricinoleic acid glyceride, diricinoleic acid glyceride, triricinoleic acid glyceride) or a reaction product of the amine polyol (a1) and/or the polyamine polyol (a2) and a hydroxycarboxylic acid derivative (e.g., chloride).

One ester (A) may be used alone or two or more esters (A) may be used in combination.

The ester (A) preferably has a weight average molecular weight (Mw) of 200 to 2,200, more preferably 400 to 1,900, from the viewpoints of castability and adhesion.

In the present invention, Mw and number average molecular weight (Mn) are measured by gel permeation chromatography using THF as a solvent and poly(oxyethylene) glycol as a standard substance. For example, the measurement can be performed under the following conditions.

Apparatus: "Waters Alliance 2695" (Waters Corporation)

Column: "Guardcolumn Super H-L" (1 column), "Shodex GPC KF-803L 8.0 mm ID×300 mm" (1 column), "Shodex GPC KF-802.5 8.0 mm ID×300 mm" (1 column), and "Shodex GPC KF-802 8.0 mm ID×300 mm" (1 column) (all available from Resonac Corporation) connected in series Eluent: 0.5% by weight triethylamine/tetrahydrofuran solution Sample solution: 0.25% by weight tetrahydrofuran solution Amount of solution injected: 20 μl Flow rate: 0.8 ml/min Measurement temperature: 40° C.

Detector: Refractive index detector

Reference material: Standard polyethylene glycol

The ester (A) in the present invention preferably has a hydroxy equivalent (a value obtained by dividing the number average molecular weight by the number of hydroxy groups per molecule) (unit: g/eq) of 50 to 600 g/eq, more preferably 100 to 500 g/eq, particularly preferably 120 to 400 g/eq, from the viewpoints of castability and adhesion.

The ester (A) preferably has a Mw of 200 to 2,200 and a hydroxy equivalent of 50 to 600 g/eq.

The ester (A) in the present invention preferably has an amino group equivalent (value obtained by dividing the number average molecular weight by the number of amino groups per molecule) (unit: g/eq) of 100 to 1,000 g/eq, more preferably 200 to 800 g/eq, from the viewpoints of castability and adhesion.

The product of the hydroxy equivalent and the amino group equivalent of the ester (A) in the present invention (hydroxy equivalent×amino group equivalent) is preferably 5,000 to 600,000 $(g/eq)^2$, more preferably 20,000 to 400,000 $(g/eq)^2$, particularly preferably 30,000 to 300,000 $(g/eq)^2$.

When the product of the hydroxy equivalent and the amino group equivalent is within the above range, the urethane formation reaction of the polyurethane resin-forming composition proceeds at an appropriate rate, making it easier to achieve both the pot life and castability of the polyurethane resin-forming composition and the physical properties of the polyurethane resin.

<Polyol Composition for Producing Polyurethane Resin>

The polyol composition for producing a polyurethane resin of the present invention contains the ester (A) as an essential component. In addition to the ester (A), the polyol composition may contain at least one selected from the group consisting of the amine polyol (a1), the polyamine polyol (a2), and a different polyol component (C).

For each of the amine polyol (a1), the polyamine polyol (a2), and the different polyol component (C), one type may be used alone or two or more types may be used in combination.

Examples of the different polyol component (C) include castor oil polyols (C1), adducts (C2) of alkanolamines with C2-C3 alkylene oxide, adducts (C3) of polyamines with C2-C3 alkylene oxide, polyester polyols (C4), polyether polyols (C5), and mixtures of two or more of these.

Examples of the castor oil polyols (C1) include those having a number average molecular weight (Mn) of 300 to 4,000, such as castor oil (including partially dehydrated castor oil, partially acylated castor oil, and hydrogenated castor oil); castor oil fatty acid esters obtained by transesterification of polyether polyols and castor oil; castor oil fatty acid esters obtained by esterification of polyether polyols and castor oil fatty acid; and adducts of castor oil with alkylene oxide obtained by adding a C2-C8 alkylene oxide (e.g., ethylene oxide, propylene oxide, butylene oxide, styrene oxide, a mixture of two or more of these; hereinafter, alkylene oxide may be abbreviated as AO) to castor oil.

The castor oil polyols (C1) also include glycerides (mono-, di- and triglycerides) of ricinoleic acid contained in castor oil.

Examples of the adducts (C2) of alkanolamines with C2-C3 alkylene oxide include adducts of C2-C12 alkanolamines (e.g., monoethanolamine, diethanolamine, triethanolamine) with C2-C3 alkylene oxide, excluding the amine polyol (a1) represented by the formula (1).

Examples of the adducts (C3) of polyamines with C2-C3 alkylene oxide include those obtained by adding a C2-C3 alkylene oxide to any of the following polyamines (c31) to (c34), excluding the polyamine polyol (a2) represented by the formula (2).

(c31) Aliphatic poly (divalent to heptavalent) amines include:

C2-C12 alkylene diamines (e.g., ethylene diamine, propylene diamine); polyalkylene (the number of carbon atoms: 2 to 12) poly (trivalent to hexavalent or higher) amines [e.g., diethylene triamine, triethylene tetramine, tetraethylene pentamine]; and their alkyl (the number of carbon atoms: 1 to 4) or hydroxyalkyl (the number of carbon atoms: 2 to 4) substituted products [e.g., dialkyl (the number of carbon atoms: 1 to 3) aminopropylamines, trimethylhexamethylene diamine, aminoethylethanolamine].

(c32) Alicyclic ring-containing poly (divalent or trivalent) amines include:

those having 4 to 15 carbon atoms (e.g., 1,3-diaminocyclohexane, isophoronediamine).

(c33) Heterocycle-containing poly (divalent or trivalent) amines include:

those having 4 to 15 carbon atoms (e.g., piperazine, N-aminoethylpiperazine, 1,4-diaminoethylpiperazine).

(c34) Aromatic ring-containing polyamines include:

those having 8 to 15 carbon atoms (e.g., xylylenediamine, tetrachloro-p-xylylenediamine, diaminodiphenylmethane).

Examples of the polyester polyols (C4) include those having an Mn of 150 to 4,000, excluding the (C1) to (C3), such as linear or branched polyester polyols formed from polyols [at least one selected from the group consisting of the adducts (C2) of alkanolamines with C2-C3 alkylene oxide and polyhydric alcohols, which are described below) and C2-C20 polycarboxylic acids, which are described below; polylactone polyols (e.g., polyols, such as polycaprolactone polyols, obtained by addition polymerizing a C6-C10 (substituted) caprolactone such as ε-caprolactone, α-methyl-ε-caprolactone, or ε-methyl-ε-caprolactone to a mixture of one or more low-molecular-weight polyols each having an Mn or a chemical formula weight of less than 300 as an initiator, which is described below in the presence of a catalyst (e.g., an organometallic compound, a metal chelate compound, a fatty acid metal acyl compound)); polyether ester polyols obtained by addition polymerizing AO to a polyester terminated with a carboxyl group and/or a hydroxy group; and polycarbonate polyols.

Examples of the low-molecular-weight polyols each having an Mn or chemical formula weight of less than 300 include: C2-C24 polyols (e.g., ethylene glycol, diethylene glycol, propylene glycol, 1,4-butanediol, 1,6-hexanediol, neopentyl glycol, glycerol, trimethylolpropane, hexanetriol, pentaerythritol, sorbitol, sucrose, and hydrogenated bisphenol A); and those having an Mn or chemical formula weight of less than 300 among alkylene oxide adducts prepared from any one of the above polyols or a mixture of two or more of these polyols as a starting material (s).

Examples of the polyether polyols (C5) include those excluding the (C1) to (C4), such as aliphatic polyether polyols and aromatic ring-containing polyether polyols. Examples of the aliphatic polyether polyols include polyoxyethylenes (e.g., polyethylene glycol), polyoxypropylenes (e.g., polypropylene glycol), polyoxyethylene/propylene (the addition form may be block and/or random), and polytetramethylene ether glycol.

Examples of the aromatic ring-containing polyether polyols include bisphenol polyether polyols (e.g., an adduct of bisphenol A with 2 to 20 mol of EO, an adduct of bisphenol A with 2 to 20 mol of PO) and adducts of resorcin with 2 to 20 mol of EO and/or PO.

The polyether polyols (C5) can be obtained by, for example, a ring-opening addition reaction of AO to an aliphatic or aromatic ring-containing low-molecular-weight active hydrogen atom-containing compound (preferably a polyhydric alcohol, which is described below) in the presence of a catalyst (e.g., an alkali metal hydroxide, a Lewis acid).

Examples of the polyhydric alcohol include aliphatic polyhydric (dihydric or higher) alcohols, alicyclic ring-containing dihydric alcohols, and aromatic ring-containing polyhydric (dihydric to tetrahydric) alcohols.

Examples of the aliphatic dihydric alcohols include ethylene glycol (EG), propylene glycol (PG), 1,4-butanediol (1,4-BD), neopentyl glycol (NPG), and 1,6-hexanediol (1,6-HD). Examples of the aliphatic trihydric alcohols include glycerol (GR), trimethylolpropane (TMP), and hexanetriol. Examples of the aliphatic tetrahydric alcohols include pentaerythritol. Examples of the aliphatic hexahydric alcohols include sorbitol. Examples of the aliphatic octahydric alcohols include sucrose.

Examples of the alicyclic ring-containing dihydric alcohols include 1,4-cyclohexanediol, cyclohexanedimethanol, and hydrogenated bisphenol A.

Examples of the aromatic ring-containing polyhydric (dihydric to tetrahydric) alcohols include xylylene glycol, bis(hydroxyethyl)benzene, and bisphenol A.

Examples of the C2-C20 polycarboxylic acids include dicarboxylic acids such as aliphatic dicarboxylic acids (e.g., succinic acid, adipic acid, azelaic acid, sebacic acid, fumaric acid, maleic acid), alicyclic dicarboxylic acids (e.g., dimer acid), and aromatic dicarboxylic acids (e.g., terephthalic acid, isophthalic acid, phthalic acid); trivalent or higher polycarboxylic acids (e.g., trimellitic acid, pyromellitic acid); anhydrides thereof (e.g., succinic anhydride, maleic anhydride, phthalic anhydride, trimellitic anhydride); and combinations of these.

Of the different polyol components (C), the castor oil polyols (C1), the adducts (C2) of alkanolamines with C2-C3 alkylene oxide, and the adducts (C3) of polyamines with C2-C3 alkylene oxide are preferred, with the castor oil polyols (C1) and the adducts (C2) of alkanolamines with C2-C3 alkylene oxide being more preferred, and the castor oil polyols (C1) being particularly preferred, from the viewpoints of castability and moisture and heat resistance.

In addition to the ester (A), the polyol composition for producing a polyurethane resin of the present invention preferably further contains the castor oil polyol (C1), and particularly preferably further contains the amine polyol (a1) and/or the polyamine polyol (a2) and the castor oil polyol (C1), from the viewpoint of achieving all the pot life and castability of the polyurethane resin-forming composition and the moisture and heat resistance and substrate adhesion of the cured polyurethane resin.

The amount of the ester (A) in the polyol composition for producing a polyurethane resin of the present invention is preferably 0.5 to 80% by weight, more preferably 5 to 60% by weight, particularly preferably 10 to 50% by weight, based on the weight of the polyol composition for producing a polyurethane resin, from the viewpoint of achieving all the pot life and castability of the polyurethane resin-forming composition and the moisture and heat resistance and substrate adhesion of the cured polyurethane resin.

The total amount of the different polyol component (C), the amine polyol (a1), and the polyamine polyol (a2) in the polyol composition for producing a polyurethane resin is preferably 0 to 99.8% by weight, more preferably 20 to 99.8% by weight, still more preferably 20 to 99.5% by weight, particularly preferably 40 to 95% by weight, most preferably 50 to 90% by weight, based on the weight of the polyol composition for producing a polyurethane resin, from the viewpoint of achieving all the pot life and castability of the polyurethane resin-forming composition and the moisture and heat resistance and substrate adhesion of the cured polyurethane resin.

The polyol composition for producing a polyurethane resin of the present invention preferably has a hydroxy value (KOHmg/g) of 50 to 450 KOHmg/g, more preferably 100 to 400 KOHmg/g, particularly preferably 150 to 350 KOHmg/g, from the viewpoints of castability and adhesion.

The hydroxy value in the present invention is measured in accordance with JIS K 1557-1.

The polyol composition for producing a polyurethane resin of the present invention preferably has an amino group equivalent (g/eq) of 250 to 1,200 g/eq, more preferably 500 to 1,100 g/eq, particularly preferably 700 to 900 g/eq, from the viewpoint of castability.

When the polyol composition contains two or more components, the amino group equivalent (g/eq) is calculated from the following equation.

Amino group equivalent of polyol composition [g/eq]=1/[Σ{(1/amino group equivalent [g/eq] of each component in polyol composition)×(weight fraction [g/g] of the each component in polyol composition)}]

The polyol composition for producing a polyurethane resin of the present invention preferably has an oxyalkylene concentration (% by weight) of 1 to 20% by weight, more preferably 1.8 to 5% by weight, particularly preferably 2 to 5% by weight, most preferably 2 to 4% by weight, based on the weight of the polyol composition for producing a polyurethane resin, from the viewpoint of the moisture and heat resistance of the cured polyurethane resin.

The oxyalkylene concentration of the polyol composition for producing a polyurethane resin in the present invention is a value obtained by dividing the weight (g) of oxygen atoms derived from the C2-C3 alkylene oxides contained in the ester (A), different polyol component (C), amine polyol (a1), and polyamine polyol (a2) by the weight (g) of the polyol composition.

<Polyurethane Resin-Forming Composition>

The polyurethane resin-forming composition of the present invention contains the polyol composition for producing a polyurethane resin and a polyisocyanate (B).

<Polyisocyanate (B)>

Examples of the polyisocyanate (B) in the present invention include an organic polyisocyanate (B1) having two or more isocyanate groups in one molecule and an isocyanate-terminated urethane prepolymer (BU) obtained by reacting the organic polyisocyanate (B1) with a polyol. One polyisocyanate (B) may be used alone or two or more polyisocyanates (B) may be used in combination.

The organic polyisocyanate (B1) may be any of those conventionally used in the production of polyurethanes. Examples thereof include C4-C22 linear aliphatic polyisocyanates (B11) (the number of carbon atoms includes the carbon atoms of isocyanate groups (hereinafter sometimes abbreviated as NCO groups), the same applies to the following polyisocyanates); C8-C18 alicyclic polyisocyanates (B12); C8-C26 aromatic polyisocyanates (B13); C10-C18 araliphatic polyisocyanates (B14); and modified products (B15) of these polyisocyanates.

Examples of the C4-C22 linear aliphatic polyisocyanates (B11) include ethylene diisocyanate, tetramethylene diisocyanate, hexamethylene diisocyanate (hereinafter sometimes abbreviated as HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

Examples of the C8-C18 alicyclic polyisocyanates (B12) include isophorone diisocyanate (hereinafter sometimes abbreviated as IPDI), 4,4-dicyclohexylmethane diisocyanate (hereinafter sometimes abbreviated as hydrogenated MDI), cyclohexylene diisocyanate, methylcyclohexylene diisocyanate, bis(2-isocyanatoethyl)-4-cyclohexene-1,2-dicarboxylate, and 2,5- or 2,6-norbornane diisocyanate.

Examples of the C8-C26 aromatic polyisocyanates (B13) include 1,3- or 1,4-phenylene diisocyanate, 2,4- or 2,6-tolylene diisocyanate (hereinafter sometimes abbreviated as TDI), crude TDI, 2,2'-, 2,4'-, or 4,4'-diphenylmethane diisocyanate (hereinafter sometimes abbreviated as MDI), crude MDI, polymeric MDI, polyaryl polyisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylene diisocyanate, 4,4',4''-triphenylmethane triisocyanate, and m- or p-isocyanatophenylsulfonyl isocyanate.

Furthermore, polymers of the C8-C26 aromatic polyisocyanates (B13) may be used.

Examples of the C10-C18 araliphatic polyisocyanates (B14) include m- or p-xylylene diisocyanate and α,α,α',α'-tetramethylxylylene diisocyanate.

The modified products (B15) include modified products of the above-described polyisocyanates (e.g., modified products containing a urethane group, a carbodiimide group, an allophanate group, a urea group, a biuret group, a uretdione group, a uretoimine group, an isocyanurate group, or an oxazolidone group). Examples thereof include modified products of polyisocyanates such as modified MDI (e.g., urethane-modified MDI, carbodiimide-modified MDI, trihydrocarbyl phosphate-modified MDI), urethane-modified TDI, biuret-modified HDI, isocyanurate-modified HDI, and isocyanurate-modified IPDI.

Preferred of the organic polyisocyanates (B1) are the C8-C26 aromatic polyisocyanates (B13) and the modified products (B15) thereof, with 2,2'-, 2,4'-, or 4,4'-diphenylmethane diisocyanate and modified products of these being more preferred, from the viewpoints of reactivity and the like.

An example of the isocyanate-terminated urethane prepolymer (BU) is one produced by a urethane formation reaction between an excess of the organic polyisocyanate (B1) and a polyol [usually, the equivalent ratio (the number of moles of NCO groups in the polyisocyanate/the number of moles of OH groups in the polyol) is 1.1/1 to 50/1) by a known method.

Here, the higher the equivalent ratio, the lower the viscosity but the greater the shrinkage upon curing. Thus, the equivalent ratio is preferably 1.5/1 to 30/1, more preferably 2/1 to 10/1. When the equivalent ratio is high, a mixture of the isocyanate-terminated urethane prepolymer (BU) and the organic polyisocyanate (B1) is obtained.

Examples of the polyol used for the isocyanate-terminated urethane prepolymer (BU) include the castor oil polyols (C1), the adducts (C2) of alkanolamines with C2-C3 alkylene oxide, the adducts (C3) of polyamines with C2-C3 alkylene oxide, the amine polyols (a1), the polyamine polyols (a2), the polyester polyols (C4), and the polyether polyols (C5). From the viewpoints of castability and moisture and heat resistance, preferred are the castor oil polyols (C1), the adducts (C2) of alkanolamines with C2-C3 alkylene oxide, and the polyester polyols (C4), with the castor oil polyols (C1) and the polyester polyols (C4) being more preferred and the castor oil polyols (C1) being particularly preferred.

From the viewpoints of castability, curability, adhesion, and the like, the polyisocyanate (B) in the present invention preferably contains the isocyanate-terminated urethane prepolymer (BU), more preferably in an amount of 20% by weight or more based on the weight of the polyisocyanate (B).

The polyisocyanate (B) preferably has an isocyanate group content (NCO content) of 10 to 40% by weight, more preferably 15 to 35% by weight, from the viewpoint of adhesion.

The equivalent ratio of the polyol composition to the polyisocyanate (B) in the polyurethane resin-forming composition of the present invention (the number of moles of OH groups in the polyol composition/the number of moles of NCO groups in the polyisocyanate (B)) is preferably 0.5 to 2.0, more preferably 0.7 to 1.5, particularly preferably 0.8 to 1.2, from the viewpoints of moisture and heat resistance and adhesion.

The polyurethane resin-forming composition of the present invention preferably has an oxyalkylene concentration (% by weight) of 0.1 to 3.0% by weight, more preferably 1.0 to 2.5% by weight, based on the weight of the polyurethane resin-forming composition, from the viewpoints of the moisture and heat resistance and the like of the cured polyurethane resin.

The oxyalkylene concentration of the polyurethane resin-forming composition in the present invention is a value obtained by dividing the total weight (g) of oxygen atoms derived from the C2-C3 alkylene oxides contained in the ester (A), different polyol component (C), amine polyol (a1), polyamine polyol (a2), and polyisocyanate (B) by the weight (g) of the polyurethane resin-forming composition.

The polyurethane resin-forming composition of the present invention may further contain a known additive (G) within a range that does not impair the effects of the present invention. Examples of the additive (G) include inorganic fillers (G1), organic fillers (G2), water-absorbing resin particles (G3), lubricants (G4), plasticizers (G5), thixotropy-imparting agents (G5), foaming agents (G6), ultraviolet absorbers (G7), dxidation inhibitors (G8), antioxidants (G9), colorants (G10), flame retardants (G11), antifungal agents (G12), dispersants (anti-settling agents) (G13), defoamers (G14), and surfactants (G15).

The amount of additive (G) added is preferably 20% by weight or less, more preferably 5% by weight or less, based on the weight of the polyurethane resin-forming composition.

The polyurethane resin-forming composition of the present invention can be produced by mixing the polyol composition for producing a polyurethane resin, the polyisocyanate (B), and an optional additive (G) using a mixer (such as a static mixer or a mechanical mixer) or a two-component urethane casting machine.

The polyol composition for producing a polyurethane resin and the polyisocyanate (B) start a curing (urethane formation) reaction almost simultaneously with the start of mixing. Therefore, the composition of the present invention is preferably a two-component polyurethane resin-forming composition containing a base agent containing the polyol composition for producing a polyurethane resin and a curing agent containing the polyisocyanate (B).

The polyurethane resin-forming composition of the present invention can be molded into various forms for use according to the application by known molding methods such as cast molding (e.g., static molding, centrifugal molding, vacuum molding), coating molding (e.g., roll coating, flow coating, dip coating, slit coating, spray coating), and sheet molding (e.g., a method of directly extruding from a T-die, a method of rolling with a roll, a method of stretching, a method of filling a mold with the polyurethane resin-forming composition and then pressing it under pressure, a method of preparing a solution of the polyurethane resin-forming composition and then casting the solution or coating another resin or a metal sheet with the solution).

The polyurethane resin-forming composition of the present invention is preferably for coating or casting.

The time from the start of mixing the polyol composition for producing a polyurethane resin and the polyisocyanate (B) until the mixture loses its fluidity (the time until the viscosity measured with a B-type viscometer reaches 10,000 mPa·s) is usually 3 to 60 minutes in an atmosphere of 25° C., for example. From the viewpoints of castability, coatability, and curability, it is preferably 6 to 60 minutes. The polyurethane resin is deemed to be completely cured when no change in hardness is observed.

The polyurethane resin does not necessarily have to be completely cured for practical use, but it is preferably cured until its hardness (Shore D: instantaneous value) reaches a range of 20 to 100. It is also possible to shorten the post-curing time by increasing the curing temperature (for example, to 40° C. to 60° C.). The hardness in the present invention is measured in accordance with JIS K 7312 (hardness test), and the instantaneous value is the value immediately after the needle of a hardness tester is pressed against the resin.

The polyol composition for producing a polyurethane resin, the polyisocyanate (B), and an optional additive (G) are adjusted to a temperature of 25° C. and are then mixed. The viscosity a few minutes (e.g., one minute, three minutes) after the start of mixing (the viscosity at the early stage of mixing) is preferably 300 to 3,000 mPa·s, more preferably 500 to 2,000 mPa·s, from the viewpoints of castability, coatability, handling, and the like.

The viscosity of the polyurethane resin-forming composition of the present invention can be measured using a B-type viscometer.

<Polyurethane Resin>

The polyurethane resin of the present invention is a cured product obtained by curing the polyurethane resin-forming composition. The polyurethane resin can be prepared as follows: the polyurethane resin-forming composition containing the polyol composition for producing a polyurethane resin and the polyisocyanate (B) is mixed and optionally post-cured as described above to allow the curing (urethane formation) reaction to proceed.

The curing temperature is preferably 10° C. to 140° C., more preferably 25° C. to 120° C., from the viewpoints of curability and the moisture and heat resistance and heat resistance of the cured polyurethane resin.

The polyol composition for producing a polyurethane resin of the present invention can provide a polyurethane resin-forming composition having low viscosity and an appropriately long pot life and thus having good castability, and also provide a cured polyurethane resin having excellent moisture and heat resistance and substrate adhesion. Thus, the polyol composition is useful as materials for a wide range of applications such as adhesive or pressure-sensitive adhesive application and coating, casting, or sealing application, particularly significantly useful for coating or casting application. Specifically, the polyol composition is particularly suitable and useful for a cast sealant for blood treatment devices, a cast sealant for water purifiers, a potting material for electronic materials, and an agricultural coating agent.

The present specification discloses the following.

The present disclosure (1) relates to a polyol composition for producing a polyurethane resin, the polyol composition containing: an ester (A) of a hydroxycarboxylic acid (h) and at least one of an amine polyol (a1) represented by the following formula (1) or a polyamine polyol (a2) represented by the following formula (2), the formula (1) being as follows:

[Chem. 5]

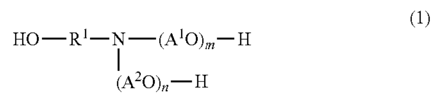

(1)

wherein $R^1$ represents a C2-C12 alkylene group; $A^1O$ and $A^2O$ each independently represent a C2-C3 oxyalkylene group; and m and n each independently represent a number average mole of oxyalkylene groups added, are each a number of 0 to 2, and satisfy the equation: m+n=1.5 to 4.0, the formula (2) being as follows:

[Chem. 6]

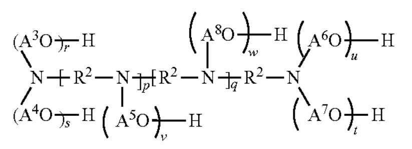

(2)

wherein each $R^2$ independently represents a C2-C12 alkylene group; p and q each independently represent an integer of 0 or 1; $A^3O$, $A^4O$, $A^5O$, $A^6O$, $A^7O$, and $A^8O$ each independently represent a C2-C3 oxyalkylene group; and r, s, t, u, v, and w each independently represent a number average mole of oxyalkylene groups added, are each a number of 0 to 2, and satisfy the equation: r+s+t+u+v+w=3.0 to 7.0, where when p is 0, v is 0, and when q is 0, w is 0.

The present disclosure (2) relates to the polyol composition for producing a polyurethane resin according to the disclosure (1), wherein the ester (A) has a weight average molecular weight (Mw) of 200 to 2,200 and a hydroxy equivalent of 50 to 600 g/eq.

The present disclosure (3) relates to the polyol composition for producing a polyurethane resin according to the disclosure (1) or (2), wherein a product of the hydroxy equivalent of the ester (A) and an amino group equivalent of the ester (A) is 5,000 to 600,000 $(g/eq)^2$.

The present disclosure (4) relates to the polyol composition for producing a polyurethane resin according to any one of the disclosures (1) to (3), wherein the hydroxycarboxylic acid (h) is a C7-C21 monocarboxylic acid (h1) having one hydroxy group in a molecule.

The present disclosure (5) relates to the polyol composition for producing a polyurethane resin according to any one of the disclosures (1) to (4), wherein the polyol composition contains the ester (A) in an amount of 0.5 to 80% by weight based on the weight of the polyol composition for producing a polyurethane resin.

The present disclosure (6) relates to the polyol composition for producing a polyurethane resin according to any one of the disclosures (1) to (5), further containing a castor oil polyol (C1).

The present disclosure (7) relates to the polyol composition for producing a polyurethane resin according to any one of the disclosures (1) to (6), further containing at least one of the amine polyol (a1) or the polyamine polyol (a2).

The present disclosure (8) relates to a polyurethane resin-forming composition containing: the polyol composition for producing a polyurethane resin according to any one of the disclosures (1) to (7); and a polyisocyanate (B).

The present disclosure (9) relates to the polyurethane resin-forming composition according to the disclosure (8), which is for coating or casting.

The present disclosure (10) relates to a polyurethane resin, which is a cured product of the polyurethane resin-forming composition according to the disclosure (8) or (9).

EXAMPLES

The present invention is further described below with reference to examples, but the present invention is not limited thereto.

The following describes the raw materials used in Production Examples and Comparative Production Examples.

<(Poly)Amine Polyol (a)>

(a1-1): Adduct of monoethanolamine with 2 mol of PO (produced in Production Example 1, N-hydroxyethyl-N,N-di(2-hydroxypropyl)amine)

(a2-1): Adduct of ethylenediamine with 4 mol of PO [Sanyo Chemical Industries, Ltd., “Newpol NP-300”, N,N,N',N'-tetrakis(2-hydroxypropyl)ethylenediamine]

(a2-2): Adduct of ethylenediamine with 4 mol of EO [Sanyo Chemical Industries, Ltd., “Sannix NE-240”, N,N,N',N'-tetrakis(2-hydroxyethyl)ethylenediamine]

(a2-3): Adduct of diethylenetriamine with 5 mol of PO [Sanyo Chemical Industries, Ltd., "Newpol NP-400", N,N,N',N",N"-pentakis(2-hydroxypropyl)diethylenetriamine]

(a2-4): Adduct of triethylenetetramine with 6 mol of PO (produced in Production Example 2, N,N,N',N",N"',N"'-hexakis(2-hydroxypropyl)triethylenetetramine)

<Comparative Compound (a')>

(a'-1): Adduct of ethylenediamine with 9 mol of PO (produced in Comparative Production Example 1)

(a'-2): Adduct of diethylenetriamine with 10 mol of PO (produced in Comparative Production Example 2)

(a'-3): Adduct of monoethanolamine with 7 mol of PO (produced in Comparative Production Example 3)

<Hydroxycarboxylic Acid (h)>

(h-1): Ricinoleic acid [Tokyo Chemical Industry Co., Ltd., ricinoleic acid, molecular weight: 299, hydroxy value: 188 KOHmg/g, acid value: 188 KOHmg/g]

(h-2): Castor oil fatty acid [Hokoku Corporation, "CO-FA", molecular weight: 300, hydroxy value: 188 KOHmg/g, acid value: 188 KOHmg/g]

(h-3): Lactic acid [FUJIFILM Wako Pure Chemical Corporation, molecular weight: 90, hydroxy value: 623 KOHmg/g, acid value: 623 KOHmg/g]

<Comparative Carboxylic Acid (h')>

(h'-1): Oleic acid [NOF Corporation, "NAA-34LS", molecular weight: 282, acid value: 398 KOHmg/g]

<Condensation Catalyst>

Titanium dihydroxy bis(triethanolaminate) (produced by the method described in Production Example 1 of JP 2006-243715 A)

Production Example 1 [Production of Amine Polyol (a1-1)]

A 1 L autoclave was charged with 61 parts by weight (1 mol) of monoethanolamine and purged with nitrogen gas. Then, the pressure was set to normal pressure and the temperature was raised to 95° C. At the same temperature, 116 parts by weight (2 mol) of propylene oxide was gradually added dropwise while keeping the internal pressure of the autoclave from reaching 0.3 MPa or higher. The temperature was controlled in the range of 90° C. to 110° C., and the reaction was carried out for a total of five hours. Thereby, the amine polyol (a1-1), which was an adduct of monoethanolamine with 2 mol of PO, was obtained.

Production Example 2: [Production of Polyamine Polyol (a2-4)]

A 1 L autoclave was charged with 146 parts by weight (1 mol) of triethylenetetramine and purged with nitrogen gas. Then, the pressure was set to normal pressure and the temperature was raised to 95° C. At the same temperature, 349 parts by weight (6 mol) of propylene oxide was gradually added dropwise while keeping the internal pressure of the autoclave from reaching 0.3 MPa or higher. The temperature was controlled in the range of 90° C. to 110° C., and the reaction was carried out for a total of five hours. Thereby, the polyamine polyol (a2-4), which was an adduct of triethylenetetramine with 6 mol of PO, was obtained.

Production Example 3 [Production of Ester (A-1)]

A reaction vessel equipped with a cooling tube, a thermometer, a stirrer, a dehydration device, and a nitrogen inlet tube was charged with 49.8 parts by weight of the polyamine polyol (a2-1), 50.2 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-1) was obtained.

Production Example 4 [Production of Ester (A-2)]

A reaction vessel equipped with a cooling tube, a thermometer, a stirrer, a dehydration device, and a nitrogen inlet tube was charged with 55.4 parts by weight of the polyamine polyol (a2-2), 44.6 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-2) was obtained.

Production Example 5 [Production of Ester (A-3)]

A reaction vessel equipped with a cooling tube, a thermometer, a stirrer, a dehydration device, and a nitrogen inlet tube was charged with 42.7 parts by weight of the polyamine polyol (a2-3), 57.3 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-3) was obtained.

Production Example 6 [Production of Ester (A-4)]

A reaction vessel equipped with a cooling tube, a thermometer, a stirrer, a dehydration device, and a nitrogen inlet tube was charged with 19.9 parts by weight of the polyamine polyol (a2-1), 80.1 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-4) was obtained.

Production Example 7 [Production of Ester (A-5)]

A reaction vessel equipped with a cooling tube, a thermometer, a stirrer, a dehydration device, and a nitrogen inlet tube was charged with 13.0 parts by weight of the polyamine polyol (a2-3), 87.0 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-5) was obtained.

Production Example 8 [Production of Ester (A-6)]

A reaction vessel equipped with a cooling tube, a thermometer, a stirrer, a dehydration device, and a nitrogen inlet tube was charged with 64.4 parts by weight of the amine polyol (a1-1), 35.6 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-6) was obtained.

Production Example 9 [Production of Ester (A-7)]

A reaction vessel equipped with a cooling tube, a thermometer, a stirrer, a dehydration device, and a nitrogen inlet tube was charged with 49.8 parts by weight of the polyamine polyol (a2-1), 50.2 parts by weight of the hydroxycarboxylic acid (h-2), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-7) was obtained.

Production Example 10 (Production of Ester (A-8)]

A reaction vessel equipped with a cooling tube, a thermometer, a stirrer, a dehydration device, and a nitrogen inlet tube was charged with 21.5 parts by weight of the polyamine polyol (a2-4), 78.5 parts by weight of the hydroxycarboxylic acid (h-2), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-8) was obtained.

Production Example 11 [Production of Ester (A-9)]

A reaction vessel equipped with a cooling tube, a thermometer, a stirrer, a dehydration device, and a nitrogen inlet tube was charged with 40.0 parts by weight of the polyamine polyol (a2-2), 60.0 parts by weight of the hydroxycarboxylic acid (h-3), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (A-9) was obtained.

Comparative Production Example 1 [Production of Comparative Compound (a'-1)]

To 300 parts by weight of the polyamine polyol (a2-1) was added 4.2 g of a 25% aqueous tetramethylammonium hydroxide solution while avoiding the inclusion of air, and the contents were dehydrated under reduced pressure at 95° C. for one hour. The temperature was reduced to 70° C. Then, 291 parts by weight (5 mol) of propylene oxide was added dropwise over three hours while controlling the temperature to be within 70° C. to 90° C. and keeping the internal pressure of the autoclave from reaching 0.2 MPa or higher. After the dropwise addition was completed, the reaction was carried out at 70° C. for 30 minutes until the internal pressure of the autoclave showed the same pressure as that at the start of the dropwise addition.

Thereafter, the contents were heated to 160° C., and nitrogen was bubbled under reduced pressure while adjusting the nitrogen flow rate so that the internal pressure was −98 KPa. After five hours, a comparative compound (a'-1), which was an adduct of ethylenediamine with 9 mol of PO, was obtained.

The comparative compound (a'-1) had a weight average molecular weight of 590, a hydroxy value of 381 KOHmg/g, a hydroxy equivalent of 147 g/eq, an amino group equivalent of 295 g/eq, and a product of the hydroxy equivalent and the amino group equivalent of 43,365 $(g/eq)^2$.

Comparative Production Example 2 [Production of Comparative Compound (a'-2)]

To 400 parts by weight of the polyamine polyol (a2-3) was added 4.2 g of a 25% aqueous tetramethylammonium hydroxide solution while avoiding the inclusion of air, and the contents were dehydrated under reduced pressure at 95° C. for one hour. The temperature was reduced to 70° C. Then, 291 parts by weight (5 mol) of propylene oxide was added dropwise over three hours while controlling the temperature to be within 70° C. to 90° C. and keeping the internal pressure of the autoclave from reaching 0.2 MPa or higher. After the dropwise addition was completed, the reaction was carried out at 70° C. for 30 minutes until the internal pressure of the autoclave showed the same pressure as that at the start of the dropwise addition.

Thereafter, the contents were heated to 160° C., and nitrogen was bubbled under reduced pressure while adjusting the nitrogen flow rate so that the internal pressure was −98 KPa. After five hours, a comparative compound (a'-2), which was an adduct of diethylenetriamine with 10 mol of PO, was obtained.

The comparative compound (a'-2) had a weight average molecular weight of 690, a hydroxy value of 406 KOHmg/g, a hydroxy equivalent of 138 g/eq, an amino group equivalent of 230 g/eq, and a product of the hydroxy equivalent and the amino group equivalent of 31,740 $(g/eq)^2$.

Comparative Production Example 3 [Production of Comparative Compound (a'-3)]

To 165 parts by weight of the amine polyol (a1-1) was added 4.2 g of a 25% aqueous tetramethylammonium hydroxide solution while avoiding the inclusion of air, and the contents were dehydrated under reduced pressure at 95° C. for one hour. The temperature was reduced to 70° C. Then, 291 parts by weight (5 mol) of propylene oxide was added dropwise over three hours while controlling the temperature to be within 70° C. to 90° C. and keeping the internal pressure of the autoclave from reaching 0.2 MPa or higher. After the dropwise addition was completed, the reaction was carried out at 70° C. for 30 minutes until the internal pressure of the autoclave showed the same pressure as that at the start of the dropwise addition.

Thereafter, the contents were heated to 160° C., and nitrogen was bubbled under reduced pressure while adjusting the nitrogen flow rate so that the internal pressure was −98 KPa. After five hours, a comparative compound (a'-3), which was an adduct of monoethanolamine with 7 mol of PO, was obtained.

The comparative compound (a'-3) had a weight average molecular weight of 445, a hydroxy value of 378 KOHmg/g, a hydroxy equivalent of 378 g/eq, an amino group equivalent of 44 g/eq, and a product of the hydroxy equivalent and the amino group equivalent of 168,210 $(g/eq)^2$.

Comparative Production Example 4 (Production of Comparative Ester (RA-1)]

A reaction vessel equipped with a cooling tube, a thermometer, a stirrer, a dehydration device, and a nitrogen inlet tube was charged with 48.5 parts by weight of the polyamine polyol (a2-1), 51.5 parts by weight of the comparative carboxylic acid (h'-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (RA-1), which was an ester of the polyamine polyol (a2-1) and the comparative carboxylic acid (h'-1), was obtained.

Comparative Production Example 5 (Production of Comparative Ester (RA-2)]

A reaction vessel equipped with a cooling tube, a thermometer, a stirrer, a dehydration device, and a nitrogen inlet tube was charged with 25.5 parts by weight of the comparative compound (a'-1), 74.5 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (RA-2), which was an ester of the comparative compound (a'-1) and the hydroxycarboxylic acid (h-1), was obtained.

Comparative Production Example 6 (Production of Comparative Ester (RA-3)]

A reaction vessel equipped with a cooling tube, a thermometer, a stirrer, a dehydration device, and a nitrogen inlet tube was charged with 23.5 parts by weight of the comparative compound (a'-2), 76.5 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (RA-3), which was an ester of the comparative compound (a'-2) and the hydroxycarboxylic acid (h-1), was obtained.

Comparative Production Example 7 (Production of Comparative Ester (RA-4)]

A reaction vessel equipped with a cooling tube, a thermometer, a stirrer, a dehydration device, and a nitrogen inlet tube was charged with 29.1 parts by weight of the comparative compound (a'-3), 70.9 parts by weight of the hydroxycarboxylic acid (h-1), and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, an ester (RA-4), which was an ester of the comparative compound (a'-3) and the hydroxycarboxylic acid (h-1), was obtained.

The physical property values and structures of the esters (A-1) to (A-9) obtained in Production Examples 3 to 11 and the comparative esters (RA-1) to (RA-4) obtained in Comparative Production Examples 4 to 7 are shown in Table 1.

TABLE 1

| | | | Prodution Example | | | | | | |
|---|---|---|---|---|---|---|---|---|---|
| | | | 3 | 4 | 5 | 6 | 7 | 8 | 9 |
| Ester | | | (A-1) | (A-2) | (A-3) | (A-4) | (A-5) | (A-6) | (A-7) |
| Mixing formulation (parts by weight) | (Poly)amine polyol (a) | (a1-1) | — | — | — | — | — | 64.4 | — |
| | | (a2-1) | 49.8 | — | — | 19.9 | — | — | 49.8 |
| | | (a2-2) | — | 55.4 | — | — | — | — | — |
| | | (a2-3) | — | — | 42.7 | — | 13.0 | — | — |
| | | (a2-4) | — | — | — | — | — | — | — |
| | Comparative compound (a') | (a'-1) | — | — | — | — | — | — | — |
| | | (a'-2) | — | — | — | — | — | — | — |
| | | (a'-3) | — | — | — | — | — | — | — |
| | Hydroxycarboxylic acid (h) | (h-1) | 50.2 | 44.6 | 57.3 | 80.1 | 87.0 | 35.6 | — |
| | | (h-2) | — | — | — | — | — | — | 50.2 |
| | | (h-3) | — | — | — | — | — | — | — |
| | Comparative carboxylic acid (h') | (h'-1) | — | — | — | — | — | — | — |
| | Condensation catalyst | | 0.2 | 0.2 | 0.2 | 0.2 | 0.2 | 0.2 | 0.2 |
| | Total | | 100.2 | 100.2 | 100.2 | 100.2 | 100.2 | 100.2 | 100.2 |
| Physical property value | Weight average molecular weight | | 580 | 520 | 680 | 1420 | 1800 | 445 | 580 |
| | Hydroxy equivalent (g/eq) | | 145 | 130 | 136 | 354 | 361 | 378 | 145 |
| | Amino group equivalent (g/eq) | | 290 | 260 | 227 | 710 | 600 | 445 | 290 |
| | Hydroxy equivalent × amino group equivalent [$(g/eq)^2$] | | 42050 | 33800 | 30872 | 251340 | 216600 | 168210 | 42050 |
| Formula for structure of (poly)amine polyol (a) or comparative compound (a') | | | (2) | (2) | (2) | (2) | (2) | (1) | (2) |
| Symbol in formula (1) | | Number of carbon atoms of $R^1$ | — | — | — | — | — | 2 | — |
| | | $A^1O$ | — | — | — | — | — | PO | — |
| | | $A^2O$ | — | — | — | — | — | PO | — |
| | | m | — | — | — | — | — | 1 | — |
| | | n | — | — | — | — | — | 1 | — |
| Symbol in formula (2) | | Number of carbon atoms of $R^2$ | 2 | 2 | 2 | 2 | 2 | — | 2 |
| | | $A^3O$ | PO | EO | PO | PO | PO | — | PO |
| | | $A^4O$ | PO | EO | PO | PO | PO | — | PO |
| | | $A^5O$ | — | — | PO | — | PO | — | — |
| | | $A^6O$ | PO | EO | PO | PO | PO | — | PO |

TABLE 1-continued

| | | | | | | | |
|---|---|---|---|---|---|---|---|
| $A^7O$ | PO | EO | PO | PO | PO | — | PO |
| $A^8O$ | — | — | — | — | — | — | — |
| p | 0 | 0 | 1 | 0 | 1 | — | 0 |
| q | 0 | 0 | 0 | 0 | 0 | — | 0 |
| r | 1 | 1 | 1 | 1 | 1 | — | 1 |
| s | 1 | 1 | 1 | 1 | 1 | — | 1 |
| t | 1 | 1 | 1 | 1 | 1 | — | 1 |
| u | 1 | 1 | 1 | 1 | 1 | — | 1 |
| v | 0 | 0 | 1 | 0 | 1 | — | 0 |
| w | 0 | 0 | 0 | 0 | 0 | — | 0 |

| | | | Prodution Example | | Comparative Production Example | | | |
|---|---|---|---|---|---|---|---|---|
| | | | 10 | 11 | 4 | 5 | 6 | 7 |
| Ester | | | (A-8) | (A-9) | (RA-1) | (RA-2) | (RA-3) | (RA-4) |
| Mixing formulation (parts by weight) | (Poly)amine polyol (a) | (a1-1) | — | — | — | — | — | — |
| | | (a2-1) | — | — | 48.5 | — | — | — |
| | | (a2-2) | — | 40.0 | — | — | — | — |
| | | (a2-3) | — | — | — | — | — | — |
| | | (a2-4) | 21.5 | — | — | — | — | — |
| | Comparative compound (a') | (a'-1) | — | — | — | 25.5 | — | — |
| | | (a'-2) | — | — | — | — | 23.5 | — |
| | | (a'-3) | — | — | — | — | — | 29.1 |
| | Hydroxycarboxylic acid (h) | (h-1) | — | — | — | 74.5 | 76.5 | 70.9 |
| | | (h-2) | 78.5 | — | — | — | — | — |
| | | (h-3) | — | 60.0 | — | — | — | — |
| | Comparative carboxylic acid (h') | (h'-1) | — | — | 51.5 | — | — | — |
| | Condensation catalyst | | 0.2 | 0.2 | 0.2 | 0.2 | 0.2 | 0.2 |
| | Total | | 100.2 | 100.2 | 100.2 | 100.2 | 100.2 | 100.2 |
| Physical property value | Weight average molecular weight | | 2180 | 528 | 565 | 870 | 970 | 725 |
| | Hydroxy equivalent (g/eq) | | 363 | 132 | 188 | 218 | 194 | 242 |
| | Amino group equivalent (g/eq) | | 545 | 264 | 282 | 435 | 323 | 725 |
| | Hydroxy equivalent × amino group equivalent [$(g/eq)^2$] | | 197835 | 34848 | 53110 | 94613 | 62727 | 175208 |
| Formula for structure of (poly)amine polyol (a) or comparative compound (a') | | | (2) | (2) | (2) | (2) | (2) | (1) |
| Symbol in formula (1) | | Number of carbon atoms of $R^1$ | — | — | — | — | — | 2 |
| | | $A^1O$ | — | — | — | — | — | PO |
| | | $A^2O$ | — | — | — | — | — | PO |
| | | m | — | — | — | — | — | 4 |
| | | n | — | — | — | — | — | 3 |
| Symbol in formula (2) | | Number of carbon atoms of $R^2$ | 2 | 2 | 2 | 2 | 2 | — |
| | | $A^3O$ | PO | EO | PO | PO | PO | — |
| | | $A^4O$ | PO | EO | PO | PO | PO | — |
| | | $A^5O$ | PO | — | — | — | PO | — |
| | | $A^6O$ | PO | EO | PO | PO | PO | — |
| | | $A^7O$ | PO | EO | PO | PO | PO | — |
| | | $A^8O$ | PO | — | — | — | — | — |
| | | p | 1 | 0 | 0 | 0 | 1 | — |
| | | q | 1 | 0 | 0 | 0 | 0 | — |
| | | r | 1 | 1 | 1 | 3 | 2 | — |
| | | s | 1 | 1 | 1 | 2 | 2 | — |
| | | t | 1 | 1 | 1 | 2 | 2 | — |
| | | u | 1 | 1 | 1 | 2 | 2 | — |
| | | v | 1 | 0 | 0 | 0 | 2 | — |
| | | w | 1 | 0 | 0 | 0 | 0 | — |

Production Example 12 [Production of Ricinoleic Acid Diglyceride (C-2)]

A reaction vessel equipped with a cooling tube, a thermometer, a stirrer, a dehydration device, and a nitrogen inlet tube was charged with 13.4 parts by weight of glycerol, 86.6 parts by weight of ricinoleic acid, and 0.2 parts by weight of titanium dihydroxy bis(triethanolaminate) as a condensation catalyst. The contents were reacted for two hours at 180° C. under a nitrogen stream while distilling off the generated water, and further reacted for three hours under a reduced pressure of 5 to 20 mmHg. Thereby, a ricinoleic acid diglyceride (C-2) was obtained.

Examples 1 to 13 (Production of Polyol Composition (P) for Producing Polyurethane Resin)

The raw materials were mixed according to the mixing formulation (parts by weight) shown in Table 2-1 in a static mixer to obtain polyol compositions (P-1) to (P-13) for producing a polyurethane resin of the present invention.

The physical property values of the polyol compositions (P-1) to (P-13) are shown in Table 2-1.

Comparative Examples 1 to 9 [Production of Comparative Polyol Composition (RP)]

The raw materials were mixed according to the mixing formulation (parts by weight) shown in Table 2-2 in a static mixer to obtain comparative polyol compositions (RP-1) to (RP-9).

The physical property values of the comparative polyol compositions (RP-1) to (RP-9) are shown in Table 2-2.

TABLE 2-1

| | | | Example | | | | | | |
|---|---|---|---|---|---|---|---|---|---|
| | | | 1 | 2 | 3 | 4 | 5 | 6 | 7 |
| Polyol composition | | | (P-1) | (P-2) | (P-3) | (P-4) | (P-5) | (P-6) | (P-7) |
| Mixing formulation (parts by weight) | Ester (A) | (A-1) | 33.0 | — | — | — | — | — | 33.0 |
| | | (A-2) | — | 29.5 | — | — | — | — | — |
| | | (A-3) | — | — | 26.0 | — | — | — | — |
| | | (A-4) | — | — | — | — | 35.3 | — | — |
| | | (A-5) | — | — | — | — | — | 68.0 | — |
| | | (A-6) | — | — | — | 30.0 | — | — | — |
| | | (A-7) | — | — | — | — | — | — | — |
| | | (A-8) | — | — | — | — | — | — | — |
| | | (A-9) | — | — | — | — | — | — | — |
| | Comparative compound (a') | (a'-1) | — | — | — | — | — | — | — |
| | | (a'-2) | — | — | — | — | — | — | — |
| | | (a'-3) | — | — | — | — | — | — | — |
| | Comparative ester (RA) | (RA-1) | — | — | — | — | — | — | — |
| | | (RA-2) | — | — | — | — | — | — | — |
| | | (RA-3) | — | — | — | — | — | — | — |
| | | (RA-4) | — | — | — | — | — | — | — |
| | (Poly)amine polyol (a) | (a1-1) | — | — | — | — | — | — | — |
| | | (a2-1) | — | — | — | — | — | — | — |
| | | (a2-2) | — | — | — | — | — | — | — |
| | Different polyol component (C) | (C-1) | 26.8 | 42.3 | 25.9 | — | 25.9 | 16.0 | 26.8 |
| | | (C-2) | 40.2 | 28.2 | 48.1 | 70.0 | 38.8 | 16.0 | 40.2 |
| | Total | | 100.0 | 100.0 | 100.0 | 100.0 | 100.0 | 100.0 | 100.0 |
| Physical property value | Amount of ester [(A)/(P) or (RA)/(RP)] (% by weight) | | 33.0 | 29.5 | 26.0 | 30.0 | 35.3 | 68.0 | 33.0 |
| | Hydroxy value (KOHmg/g) | | 263 | 260 | 260 | 205 | 187 | 168 | 263 |
| | Amino group equivalent (g/eq) | | 879 | 881 | 873 | 1483 | 2012 | 882 | 879 |
| | Oxyalkylene concentration (% by weight) | | 3.5 | 4.4 | 2.2 | 3.7 | 3.4 | 1.8 | 3.5 |

| | | | Example | | | | | |
|---|---|---|---|---|---|---|---|---|
| | | | 8 | 9 | 10 | 11 | 12 | 13 |
| Polyol composition | | | (P-8) | (P-9) | (P-10) | (P-11) | (P-12) | (P-13) |
| Mixing formulation (parts by weight) | Ester (A) | (A-1) | 0.5 | — | — | — | — | 28.0 |
| | | (A-2) | — | — | — | — | — | — |
| | | (A-3) | — | — | — | — | — | — |
| | | (A-4) | — | — | — | — | — | — |
| | | (A-5) | — | — | — | — | — | — |
| | | (A-6) | — | — | — | — | — | — |
| | | (A-7) | — | 33.0 | — | — | 10.0 | — |
| | | (A-8) | — | — | 100.0 | — | — | — |
| | | (A-9) | — | — | — | 0.2 | — | — |
| | Comparative compound (a') | (a'-1) | — | — | — | — | — | — |
| | | (a'-2) | — | — | — | — | — | — |
| | | (a'-3) | — | — | — | — | — | — |
| | Comparative ester (RA) | (RA-1) | — | — | — | — | — | — |
| | | (RA-2) | — | — | — | — | — | — |
| | | (RA-3) | — | — | — | — | — | — |
| | | (RA-4) | — | — | — | — | — | — |
| | (Poly)amine polyol (a) | (a1-1) | — | — | — | — | — | — |
| | | (a2-1) | 15.9 | — | — | — | 15.0 | 5.0 |
| | | (a2-2) | — | — | — | 10.5 | — | — |
| | Different polyol component (C) | (C-1) | 83.6 | 26.8 | — | 40.5 | 70.0 | 26.8 |
| | | (C-2) | — | 40.2 | — | 48.8 | 5.0 | 40.2 |
| | Total | | 100.0 | 100.0 | 100.0 | 100.0 | 100.0 | 100.0 |
| Physical property value | Amount of ester [(A)/(P) or (RA)/(RP)] (% by weight) | | 0.5 | 33.0 | 100.0 | 0.2 | 10.0 | 28.0 |
| | Hydroxy value (KOHmg/g) | | 256 | 263 | 155 | 277 | 275 | 281 |
| | Amino group equivalent (g/eq) | | 927 | 879 | 545 | 1133 | 744 | 770 |
| | Oxyalkylene concentration (% by weight) | | 3.4 | 3.5 | 19.4 | 2.8 | 4.2 | 4.0 |

TABLE 2-2

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Polyol composition | | | (RP-1) | (RP-2) | (RP-3) | (RP-4) | (RP-5) | (RP-6) | (RP-7) | (RP-8) | (RP-9) |
| Mixing formulation (parts by weight) | Ester (A) | (A-1) | — | — | — | — | — | — | — | — | — |
| | | (A-2) | — | — | — | — | — | — | — | — | — |
| | | (A-3) | — | — | — | — | — | — | — | — | — |
| | | (A-4) | — | — | — | — | — | — | — | — | — |
| | | (A-5) | — | — | — | — | — | — | — | — | — |
| | | (A-6) | — | — | — | — | — | — | — | — | — |
| | | (A-7) | — | — | — | — | — | — | — | — | — |
| | | (A-8) | — | — | — | — | — | — | — | — | — |
| | | (A-9) | — | — | — | — | — | — | — | — | — |
| | Comparative compound (a') | (a'-1) | — | — | 34.0 | — | — | — | — | — | — |
| | | (a'-2) | — | — | — | 27.0 | — | — | — | — | — |
| | | (a'-3) | — | — | — | — | 40.0 | — | — | — | — |
| | Comparative ester (RA) | (RA-1) | — | — | — | — | — | 40.0 | — | — | — |
| | | (RA-2) | — | — | — | — | — | — | 80.0 | — | — |
| | | (RA-3) | — | — | — | — | — | — | — | 70.0 | — |
| | | (RA-4) | — | — | — | — | — | — | — | — | 70.0 |
| | (Poly)amine polyol (a) | (a1-1) | 17.0 | — | — | — | — | — | — | — | — |
| | | (a2-1) | — | — | — | — | — | — | — | — | — |
| | | (a2-2) | — | 15.0 | — | — | — | — | — | — | — |
| | Different polyol component (C) | (C-1) | 83.0 | 85.0 | 66.0 | 73.0 | 60.0 | 24.0 | 20.0 | 30.0 | 30.0 |
| | | (C-2) | — | — | — | — | — | 36.0 | — | — | — |
| | Total | | 100.0 | 100.0 | 100.0 | 100.0 | 100.0 | 100.0 | 100.0 | 100.0 | 100.0 |
| Physical property value | Amount of ester [(A)/(P) or (RA)/(RP)] (% by weight) | | 0 | 0 | 0 | 0 | 0 | 40.0 | 80.0 | 70.0 | 70.0 |
| | Hydroxy value (KOHmg/g) | | 293 | 277 | 236 | 227 | 248 | 241 | 238 | 182 | 211 |
| | Amino group equivalent (g/eq) | | 1053 | 800 | 868 | 852 | 110 | 705 | 544 | 461 | 1036 |
| | Oxyalkylene concentration (% by weight) | | 3.6 | 3.0 | 8.3 | 6.3 | 10.1 | 4.1 | 5.0 | 3.8 | 5.1 |

Of the raw materials shown in Tables 2-1 and 2-2, those not shown in Table 1 are as follows.

<Different Polyol Component (C)>

(C-1): Castor oil [molecular weight: 940, hydroxy value: 161 KOHmg/g]

(C-2): Ricinoleic acid diglyceride [obtained in Production Example 12, molecular weight: 659, hydroxy value: 230 KOHmg/g]

Production Example 13 (Production of Isocyanate-Terminated Urethane Prepolymer (BU-1)]

A reaction vessel equipped with a nitrogen inlet tube, an exhaust gas outlet tube, a stirrer, and a cooling tube was charged with 41 parts by weight of 2,4'-diphenylmethane diisocyanate, 27 parts by weight of 4,4'-diphenylmethane diisocyanate, and 32 parts by weight of the castor oil (C-1) [molecular weight: 940, hydroxy value: 161 KOHmg/g]. Then, nitrogen was passed through the gas phase at a flow rate of 0.5 ml/min. The contents were reacted at 60° C. for four hours with stirring to obtain an isocyanate-terminated urethane prepolymer (BU-1). The isocyanate-terminated urethane prepolymer (BU-1) had an isocyanate group content of 19.1% by weight.

Examples 14 to 26 [Production of Polyurethane Resin-Forming Composition (Q)]

Any of the polyol compositions (P) and any of the polyisocyanates (B) were mixed according to the mixing formulation (parts by weight) shown in Table 3-1 using a two-component urethane casting machine to obtain polyurethane resin-forming compositions (Q-1) to (Q-13) of the present invention.

Comparative Examples 10 to 18 [Production of Comparative Polyurethane Resin-Forming Composition (RQ)]

Any of the comparative polyol compositions (RP) and any of the polyisocyanates (B) were mixed according to the mixing formulation (parts by weight) shown in Table 3-2 using a two-component urethane casting machine to obtain comparative polyurethane resin-forming compositions (RQ-1) to (RQ-9).

The physical property values of the polyurethane resin-forming compositions (Q) and the comparative polyurethane resin-forming compositions (RQ) obtained above are shown in Tables 3-1 and 3-2.

The viscosities at the early stage of mixing (after one minute and after three minutes), the pot lives, and the castability were measured by the methods described below, and the results are shown in Tables 3-1 and 3-2.

In addition, polyurethane resins were prepared by curing the polyurethane resin-forming compositions (Q) and the comparative polyurethane resin-forming compositions (RQ) according to the procedure described below. These cured products were evaluated for moisture and heat resistance and adhesion. The results are shown in Tables 3-1 and 3-2.

TABLE 3-1

| | | | Example | | | | | | |
|---|---|---|---|---|---|---|---|---|---|
| | | | 14 | 15 | 16 | 17 | 18 | 19 | 20 |
| Polyurethane resin-forming composition | | | (Q-1) | (Q-2) | (Q-3) | (Q-4) | (Q-5) | (Q-6) | (Q-7) |
| Mixing formulation (parts by weight) | Polyol composition (P) | (P-1) | 50.0 | — | — | — | — | — | — |
| | | (P-2) | — | 50.0 | — | — | — | — | — |
| | | (P-3) | — | — | 50.0 | — | — | — | — |
| | | (P-4) | — | — | — | 50.0 | — | — | — |
| | | (P-5) | — | — | — | — | 35.1 | — | — |
| | | (P-6) | — | — | — | — | — | 60.6 | — |
| | | (P-7) | — | — | — | — | — | — | 64.5 |
| | | (P-8) | — | — | — | — | — | — | — |
| | | (P-9) | — | — | — | — | — | — | — |
| | | (P-10) | — | — | — | — | — | — | — |
| | | (P-11) | — | — | — | — | — | — | — |
| | | (P-12) | — | — | — | — | — | — | — |
| | | (P-13) | — | — | — | — | — | — | — |
| | Comparative polyol composition (RP) | (RP-1) | — | — | — | — | — | — | — |
| | | (RP-2) | — | — | — | — | — | — | — |
| | | (RP-3) | — | — | — | — | — | — | — |
| | | (RP-4) | — | — | — | — | — | — | — |
| | | (RP-5) | — | — | — | — | — | — | — |
| | | (RP-6) | — | — | — | — | — | — | — |
| | | (RP-7) | — | — | — | — | — | — | — |
| | | (RP-8) | — | — | — | — | — | — | — |
| | | (RP-9) | — | — | — | — | — | — | — |
| | Polyisocyanate (B) | (BU-1) | 50.0 | 50.0 | 50.0 | 50.0 | 64.9 | 39.4 | — |
| | | (B-2) | — | — | — | — | — | — | 35.5 |
| | Total | | 100.0 | 100.0 | 100.0 | 100.0 | 100.0 | 100.0 | 100.0 |
| Physical property value | Oxyalkylene concentration (% by weight) | | 1.8 | 2.2 | 1.1 | 1.9 | 2.1 | 1.1 | 2.3 |
| | Equivalent ratio of polyol composition and polyisocyanate (OH group/NCO group) | | 1.0 | 1.0 | 1.0 | 0.9 | 0.9 | 1.0 | 0.9 |
| Evaluation result | Viscosity at early stage of mixing (after one minute) [mPa · s] | | 1000 | 900 | 1250 | 850 | 950 | 1200 | 1050 |
| | Viscosity at early stage of mixing (after three minutes) [mPa · s] | | 2000 | 2050 | 2600 | 1600 | 1600 | 2000 | 2100 |
| | Pot life (25° C.) [sec] | | 450 | 400 | 400 | 600 | 630 | 570 | 430 |
| | Pot life (50° C.) [sec] | | 120 | 100 | 90 | 280 | 300 | 250 | 100 |
| | Castability | | ○○ | ○ | ○ | ○○ | ○○ | ○○ | ○ |
| | Moisture and heat resistance of cured product | | ○○ | ○ | ○○ | ○○ | ○○ | ○○ | ○○ |
| | Adhesion of cured product | | ○○ | ○ | ○ | ○ | ○○ | ○○ | ○ |

| | | | Example | | | | | |
|---|---|---|---|---|---|---|---|---|
| | | | 21 | 22 | 23 | 24 | 25 | 26 |
| Polyurethane resin-forming composition | | | (Q-8) | (Q-9) | (Q-10) | (Q-11) | (Q-12) | (Q-13) |
| Mixing formulation (parts by weight) | Polyol composition (P) | (P-1) | — | — | — | — | — | — |
| | | (P-2) | — | — | — | — | — | — |
| | | (P-3) | — | — | — | — | — | — |
| | | (P-4) | — | — | — | — | — | — |
| | | (P-5) | — | — | — | — | — | — |
| | | (P-6) | — | — | — | — | — | — |
| | | (P-7) | — | — | — | — | — | — |
| | | (P-8) | 50.0 | — | — | — | — | — |
| | | (P-9) | — | 50.0 | — | — | — | — |
| | | (P-10) | — | — | 50.0 | — | — | — |
| | | (P-11) | — | — | — | 50.0 | — | — |
| | | (P-12) | — | — | — | — | 50.0 | — |
| | | (P-13) | — | — | — | — | — | 50.0 |
| | Comparative polyol composition (RP) | (RP-1) | — | — | — | — | — | — |
| | | (RP-2) | — | — | — | — | — | — |
| | | (RP-3) | — | — | — | — | — | — |
| | | (RP-4) | — | — | — | — | — | — |
| | | (RP-5) | — | — | — | — | — | — |
| | | (RP-6) | — | — | — | — | — | — |
| | | (RP-7) | — | — | — | — | — | — |
| | | (RP-8) | — | — | — | — | — | — |
| | | (RP-9) | — | — | — | — | — | — |
| | Polyisocyanate (B) | (BU-1) | 50.0 | 50.0 | 50.0 | 50.0 | 50.0 | 50.0 |
| | | (B-2) | — | — | — | — | — | — |
| | Total | | 100.0 | 100.0 | 100.0 | 100.0 | 100.0 | 100.0 |
| Physical property value | Oxyalkylene concentration (% by weight) | | 1.7 | 1.8 | 2.8 | 1.4 | 2.1 | 2.0 |
| | Equivalent ratio of polyol composition and polyisocyanate (OH group/NCO group) | | 1.0 | 1.0 | 0.9 | 1.0 | 1.0 | 1.0 |
| Evaluation result | Viscosity at early stage of mixing (after one minute) [mPa · s] | | 1000 | 1000 | 1200 | 900 | 1000 | 1100 |
| | Viscosity at early stage of mixing (after three minutes) [mPa · s] | | 1950 | 2000 | 2500 | 1700 | 2000 | 2200 |
| | Pot life (25° C.) [sec] | | 480 | 450 | 400 | 650 | 450 | 450 |
| | Pot life (50° C.) [sec] | | 150 | 120 | 80 | 320 | 120 | 110 |

TABLE 3-1-continued

| | | | | | | |
|---|---|---|---|---|---|---|
| Castability | ○○ | ○○ | ○ | ○○ | ○○ | ○○ |
| Moisture and heat resistance of cured product | ○○+ | ○ | ○○ | ○○ | ○○+ | ○○+ |
| Adhesion of cured product | ○○ | ○ | ○○ | ○ | ○○ | ○○ |

TABLE 3-2

| | | | Comparative Example | | | | |
|---|---|---|---|---|---|---|---|
| | | | 10 | 11 | 12 | 13 | 14 |
| Polyurethane resin-forming composition | | | (RQ-1) | (RQ-2) | (RQ-3) | (RQ-4) | (RQ-5) |
| Mixing formulation (parts by weight) | Polyol composition (P) | (P-1) | — | — | — | — | — |
| | | (P-2) | — | — | — | — | — |
| | | (P-3) | — | — | — | — | — |
| | | (P-4) | — | — | — | — | — |
| | | (P-5) | — | — | — | — | — |
| | | (P-6) | — | — | — | — | — |
| | | (P-7) | — | — | — | — | — |
| | | (P-8) | — | — | — | — | — |
| | | (P-9) | — | — | — | — | — |
| | | (P-10) | — | — | — | — | — |
| | | (P-11) | — | — | — | — | — |
| | | (P-12) | — | — | — | — | — |
| | | (P-13) | — | — | — | — | — |
| | Comparative polyol composition (RP) | (RP-1) | 50.0 | — | — | — | — |
| | | (RP-2) | — | 50.0 | — | — | — |
| | | (RP-3) | — | — | 50.0 | — | — |
| | | (RP-4) | — | — | — | 50.0 | — |
| | | (RP-5) | — | — | — | — | 50.0 |
| | | (RP-6) | — | — | — | — | — |
| | | (RP-7) | — | — | — | — | — |
| | | (RP-8) | — | — | — | — | — |
| | | (RP-9) | — | — | — | — | — |
| | Polyisocyanate (B) | (BU-1) | 50.0 | 50.0 | 50.0 | 50.0 | 50.0 |
| | | (B-2) | — | — | — | — | — |
| | Total | | 100.0 | 100.0 | 100.0 | 100.0 | 100.0 |
| Physical property value | Oxyalkylene concentration (% by weight) | | 1.8 | 1.5 | 4.1 | 3.1 | 5.0 |
| | Equivalent ratio of polyol composition and polyisocyanate (OH group/NCO group) | | 1.0 | 1.1 | 1.1 | 1.1 | 0.9 |
| Evaluation result | Viscosity at early stage of mixing (after one minute) [mPa · s] | | 1100 | 1350 | 950 | 1100 | 800 |
| | Viscosity at early stage of mixing (after three minutes) [mPa · s] | | 3300 | 4800 | 2100 | 2500 | 1400 |
| | Pot life (25° C.) [sec] | | 300 | 250 | 420 | 390 | 650 |
| | Pot life (50° C.) [sec] | | 30 | 20 | 100 | 70 | 330 |
| | Castability | | X | X | ○ | ○ | ○○ |
| | Moisture and heat resistance of cured product | | ○○ | ○○ | X | X | X |
| | Adhesion of cured product | | ○ | ○ | X | X | X |

| | | | Comparative Example | | | |
|---|---|---|---|---|---|---|
| | | | 15 | 16 | 17 | 18 |
| Polyurethane resin-forming composition | | | (RQ-6) | (RQ-7) | (RQ-8) | (RQ-9) |
| Mixing formulation (parts by weight) | Polyol composition (P) | (P-1) | — | — | — | — |
| | | (P-2) | — | — | — | — |
| | | (P-3) | — | — | — | — |
| | | (P-4) | — | — | — | — |
| | | (P-5) | — | — | — | — |
| | | (P-6) | — | — | — | — |
| | | (P-7) | — | — | — | — |
| | | (P-8) | — | — | — | — |
| | | (P-9) | — | — | — | — |
| | | (P-10) | — | — | — | — |
| | | (P-11) | — | — | — | — |
| | | (P-12) | — | — | — | — |
| | | (P-13) | — | — | — | — |
| | Comparative polyol composition (RP) | (RP-1) | — | — | — | — |
| | | (RP-2) | — | — | — | — |
| | | (RP-3) | — | — | — | — |
| | | (RP-4) | — | — | — | — |
| | | (RP-5) | — | — | — | — |
| | | (RP-6) | 50.0 | — | — | — |
| | | (RP-7) | — | 50.0 | — | — |

TABLE 3-2-continued

| | | | | | | |
|---|---|---|---|---|---|---|
| | | (RP-8) | — | — | 50.0 | — |
| | | (RP-9) | — | — | — | 50.0 |
| | Polyisocyanate (B) | (BU-1) | 50.0 | 50.0 | 50.0 | 50.0 |
| | | (B-2) | — | — | — | — |
| | Total | | 100.0 | 100.0 | 100.0 | 100.0 |
| Physical property value | Oxyalkylene concentration (% by weight) | | 2.1 | 2.5 | 1.9 | 2.6 |
| | Equivalent ratio of polyol composition and polyisocyanate (OH group/NCO group) | | 1.1 | 1.1 | 1.4 | 1.2 |
| Evaluation result | Viscosity at early stage of mixing (after one minute) [mPa · s] | | 900 | 800 | 850 | 750 |
| | Viscosity at early stage of mixing (after three minutes) [mPa · s] | | 1800 | 1400 | 1700 | 1400 |
| | Pot life (25° C.) [sec] | | 500 | 600 | 450 | 750 |
| | Pot life (50° C.) [sec] | | 140 | 300 | 160 | 320 |
| | Castability | | ○○ | ○○ | ○○ | ○○ |
| | Moisture and heat resistance of cured product | | X | X | X | X |
| | Adhesion of cured product | | X | X | X | X |

Of the raw materials shown in Tables 3-1 and 3-2, those not shown in Tables 2-1 and 2-2 are as follows.

<Polyisocyanate (B)>

(BU-1): Isocyanate-terminated urethane prepolymer [obtained in Production Example 13, isocyanate group content: 19.1% by weight]

(B-2): Polymeric MDI [BASF INOAC Polyurethanes Ltd., "Lupranate M20S", isocyanate group content: 31.0% by weight]

(1) Viscosity at Early Stage of Mixing (after One Minute and after Three Minutes)

For Examples and Comparative Examples, using a two-component urethane casting machine [REXY Co., Ltd., model number "EX-501i" ], any of the polyol compositions (P) and the comparative polyol compositions (RP) and any of the polyisocyanates (B), whose temperatures had been adjusted in advance to 25° C., were dispensed into a disposable cup at a dispensing rate of 2 g/min according to the mixing ratios shown in Tables 3-1 and 3-2, and weighed to obtain a total weight of 50 g. At the same time that 50 g of the mixture (urethane resin-forming composition) was dispensed, viscosity measurement was started under the following conditions using a digital B-type viscometer "TV-10" [Toki Sangyo Co., Ltd.]. The viscosities (mPa·s) after one minute (60 seconds) and after three minutes were measured.

<Measurement Conditions>

Temperature: 25° C. (the temperature was controlled with a water bath)

Rotor: No. 4

Rotation speed: 30 rpm (2) Pot Life (25° C.)

The viscosity (mPa·s) of the mixture (urethane resin-forming composition) dispensed and weighed as in (1) described above was measured under the same conditions as in (1). The time [seconds] until the viscosity reached 10,000 mPa·s was defined as the pot life (25° C.).

(3) Pot Life (50° C.)

For Examples and Comparative Examples, using a two-component urethane casting machine [REXY Co., Ltd., model number "EX-501i" ], any of the polyol compositions (P) and the comparative polyol compositions (RP) and any of the polyisocyanates (B), whose temperatures had been adjusted in advance to 50° C., were dispensed into a disposable cup at a dispensing rate of 2 g/min according to the mixing ratios shown in Tables 3-1 and 3-2, and weighed to obtain a total weight of 50 g. At the same time that 50 g of the mixture (urethane resin-forming composition) was dispensed, viscosity measurement was started under the following conditions using a digital B-type viscometer "TV-10" [Toki Sangyo Co., Ltd.], and the time [seconds] until the viscosity of the mixture (mPa·s) reached 10,000 mPa·s was defined as the pot life (50° C.).

<Measurement Conditions>

Temperature: 50° C. (the temperature was controlled with a water bath)

Rotor: No. 4

Rotation speed: 30 rpm

From the viewpoint of achieving all castability, coatability, and curability, the pot life is preferably appropriately long. Depending on the application, the pot life (25° C.) is preferably 360 seconds or longer, for example. The pot life (50° C.) is more preferably 60 seconds or longer because casting or coating can be carried out even under slightly high temperature conditions.

(4) Castability

Any of the polyol compositions (P) and the comparative polyol compositions (RP) and any of the polyisocyanates (B), whose temperatures had been adjusted in advance to 25° C., were mixed according to the mixing ratios shown in Tables 3-1 and 3-2 and dispensed using a two-component urethane casting machine [REXY Co., Ltd., model number "EX-501i" ] to obtain a mixture (polyurethane resin-forming composition). The mixture was poured into a mold for forming a 10 cm×10 cm×2 mm (thickness) flat sheet, whose temperature had been adjusted to 25° C., and post-cured at 25° C. for 24 hours to obtain a cured product (polyurethane resin). The shape of the cured product was observed, and the castability into the mold was visually evaluated according to the following criteria.

<Evaluation Criteria>

○○ (Very good): The mixture flows into the entire area of the mold, conforming to its shape.

○ (Good): The mixture does not flow into an area of approximately 10% to 20% of the mold.

Δ (Fair): The mixture does not flow into an area of approximately 30% to 40% of the mold.

x (Poor): The mixture does not flow into an area of approximately more than half of the mold.

(5) Moisture and Heat Resistance of Cured Product (Polyurethane Resin)

Any of the polyurethane resin-forming compositions (Q) and the comparative polyurethane resin-forming compositions (RQ) immediately after mixing at 25° C. was poured into a mold with dimensions of 5 cm×5 cm×6 mm (thickness) prepared by placing a silicone spacer on a glass plate overlaid with a release PET film. The composition was cured by heating at 60° C. for 4 hours, and then post-cured at 25° C. for 24 hours to obtain a specimen.

The D hardness or A hardness of the specimen was measured using a type D or type A durometer disclosed in JIS K 6253 to obtain the hardness before the test.

Next, the specimen was immersed in 60° C. warm water, left for 24 hours, and then naturally cooled to 25° C. The moisture on the surface was thoroughly wiped off. Thereafter, the D hardness or A hardness was measured in the same manner as above to obtain the hardness after the test.

The hardness retention after the test was calculated from the following equation (3), and the moisture and heat resistance was evaluated according to the following criteria.

$$\text{Hardness retention (\%)} = [(\text{Hardness after test})/(\text{Hardness before test})] \times 100 \quad (3)$$

The type of durometer used is appropriately selected depending on the hardness of the specimen as described in JIS K 6253. The hardness after the test is measured with the same type of durometer used to measure the hardness before the test.

<Evaluation Criteria>

○○+ (Excellent): The hardness retention is 95% or higher.

○○ (Very good): The hardness retention is 90% or higher and lower than 95%.

○ (Good): The hardness retention is 80% or higher and lower than 90%.

x (Poor): The hardness retention is lower than 80%.

(6) Adhesion of Cured Product (Polyurethane Resin)

Two polycarbonate plates (long side 125 mm×short side 25 mm×thickness 1 mm) were prepared. The polyurethane resin-forming composition immediately after mixing at 25° C. was applied to an area 25 mm from one of the short sides of the surface (25 mm×25 mm) using a spacer to a thickness of 0.2 mm to form an adhesive area. The polycarbonate plates were attached by overlapping these adhesive areas. The composition was cured by heating at 60° C. for 4 hours, and then post-cured at 25° C. for 24 hours to obtain an adhesion specimen.

The tensile shear adhesive strength (MPa) of the adhesive specimen was measured as described in JIS K 6850:1999. The evaluation was performed according to the following criteria.

<Evaluation Criteria>

○○ (Very good): The tensile shear adhesive strength is 5 MPa or more.

○ (Good): The tensile shear adhesive strength is 4 MPa or more and less than 5 MPa.

x (Poor): The tensile shear adhesive strength is less than 4 MPa.

From the results shown in Tables 3-1 and 3-2, the polyurethane resin-forming compositions (Q-1) to (Q-12) obtained using the polyol compositions (P-1) to (P-12) for producing a polyurethane resin of the present invention have a low viscosity at the early stage of mixing, an appropriately long pot life, and good castability. The tables also demonstrate that the cured polyurethane resins have excellent moisture and heat resistance and substrate adhesion.

On the other hand, the comparative polyurethane resin-forming compositions (RQ-1) to (RQ-2) have a short pot life and poor castability, and the polyurethane resins obtained by curing the comparative polyurethane resin-forming compositions (RQ-3) to (RQ-9) have poor moisture and heat resistance and adhesion.

INDUSTRIAL APPLICABILITY

The polyol composition for producing a polyurethane resin of the present invention can provide a polyurethane resin-forming composition having low viscosity and an appropriately long pot life and thus having good castability and also provide a cured polyurethane resin having excellent moisture and heat resistance and substrate adhesion. Thus, the polyol composition is useful as materials for a wide range of applications such as adhesive or pressure-sensitive adhesive application and coating, casting, or sealing application, particularly significantly useful for coating or casting application. Specifically, the polyol composition is particularly suitable and useful for a cast sealant for blood treatment devices, a cast sealant for water purifiers, a potting material for electronic materials, and an agricultural coating agent.

The invention claimed is:

1. A polyol composition for producing a polyurethane resin, the polyol composition comprising:

a castor oil polyol (C1); and an ester (A) of a hydroxycarboxylic acid (h) and a polyamine polyol (a2) represented by the following formula (2), the formula (2) being as follows:

[Chem. 2]

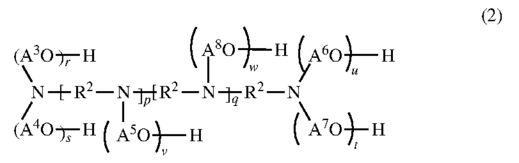

(2)

wherein each $R^2$ independently represents a C2-C12 alkylene group; p and q each independently represent an integer of 0 or 1; $A^3O$, $A^4O$, $A^5O$, $A^6O$, $A^7O$, and $A^8O$ each independently represent a C2-C3 oxyalkylene group; and r, s, t, u, v, and w each independently represent a number average mole of oxyalkylene groups added, are each a number of 1 to 2, and satisfy the equation: r+s+t+u+v+w=4.0 to 7.0, with the proviso that when p is 0, v is 0, and when q is 0, w is 0.

2. The polyol composition for producing a polyurethane resin according to claim 1, wherein the ester (A) has a weight average molecular weight (Mw) of 200 to 2,200 and a hydroxy equivalent of 50 to 600 g/eq.

3. The polyol composition for producing a polyurethane resin according to claim 1, wherein a product of a hydroxy equivalent of the ester (A) and an amino group equivalent of the ester (A) is 5,000 to 600,000 $(g/eq)^2$.

4. The polyol composition for producing a polyurethane resin according to claim 1, wherein the hydroxycarboxylic acid (h) is a C7-C21 monocarboxylic acid (h1) having one hydroxy group in a molecule.

5. The polyol composition for producing a polyurethane resin according to claim 1, wherein the polyol composition contains the ester (A) in an amount of 0.5 to 80% by weight based on the weight of the polyol composition for producing a polyurethane resin.

6. The polyol composition for producing a polyurethane resin according to claim 1, further comprising at least one of an amine polyol (a1) represented by the following formula (1) or a polyamine polyol represented by the following formula (2):

the formula (1) being as follows:

[Chem. 1]

(1)

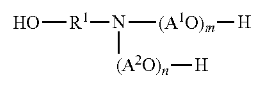

wherein $R^1$ represents a C2-C12 alkylene group; $A^1O$ and $A^2O$ each independently represent a C2-C3 oxyalkylene group; and m and n each independently represent a number average mole of oxyalkylene groups added, are each a number of 0 to 2, and satisfy the equation: m+n=1.5 to 4.0, the formula (2) being as follows:

[Chem. 2]

(2)

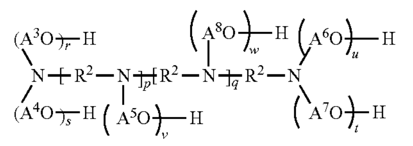

wherein each $R^2$ independently represents a C2-C12 alkylene group; p and q each independently represent an integer of 0 or 1; $A^3O$, $A^4O$, $A^5O$, $A^6O$, $A^7O$, and $A^8O$ each independently represent a C2-C3 oxyalkylene group; and r, s, t, u, v, and w each independently represent a number average mole of oxyalkylene groups added, are each a number of 0 to 2, and satisfy the equation: r+s+t+u+v+w=3.0 to 7.0, where when p is 0, v is 0, and when q is 0, w is 0.

7. A polyurethane resin-forming composition comprising:

the polyol composition for producing a polyurethane resin according to claim 1; and a polyisocyanate (B).

8. The polyurethane resin-forming composition according to claim 7, which is for coating or casting.

9. A polyurethane resin, which is a cured product of the polyurethane resin-forming composition according to claim 8.

* * * * *